United States Patent [19]

Viegas et al.

[11] Patent Number: 4,770,002
[45] Date of Patent: Sep. 13, 1988

[54] TRANSPORT REFRIGERATION SYSTEM

[75] Inventors: Herman H. Viegas; Robert K. Havemann, both of Bloomington; Bruce E. McClellan, Richfield, all of Minn.

[73] Assignee: Thermo King Corporation, Minneapolis, Minn.

[21] Appl. No.: 95,380

[22] Filed: Sep. 8, 1987

[51] Int. Cl.$^4$ .............................................. B60H 1/32
[52] U.S. Cl. ........................................ 62/239; 62/429; 415/61; 416/169 R; 416/170 R
[58] Field of Search .................... 62/239, 429; 415/61, 415/123; 416/124, 169 R, 170 R; 417/223, 319

[56] References Cited
U.S. PATENT DOCUMENTS

| | | | |
|---|---|---|---|
| 1,467,537 | 9/1923 | Dornier | 416/169 X |
| 1,771,654 | 7/1930 | Vowell | 416/124 |
| 3,059,447 | 10/1962 | Brugler | 62/429 X |
| 3,512,373 | 5/1970 | White | 62/239 X |
| 3,771,319 | 11/1973 | Nichols et al. | 417/319 X |
| 4,365,930 | 12/1982 | Ogura et al. | 415/61 |
| 4,551,986 | 11/1985 | Anderson et al. | 62/239 |

Primary Examiner—William E. Tapolcai
Attorney, Agent, or Firm—D. R. Lackey

[57] ABSTRACT

A transport refrigeration system including a compressor, a prime mover for the compressor, a condenser, and an evaporator blower assembly. The evaporator blower assembly includes a shaft driven by the prime mover, a first blower fixed to the driven shaft, a second blower journaled for rotation about the driven shaft, and a clutch for coupling and decoupling the first and second blowers. The volume of air moved through the evaporator and into the conditioned space or cargo area is thus selectable based upon need of the transport refrigeration system, without the necessity of changing the speed of the prime mover. The resulting savings in power realized when only one blower is being driven is automatically translated into fuel savings and/or increased cooling capacity.

6 Claims, 3 Drawing Sheets

TRANSPORT REFRIGERATION SYSTEM

BACKGROUND OF THE INVENTION

1. Field of the Invention

The invention relates to transport refrigeration systems, such as the refrigeration systems used to condition frozen and perishable loads in the cargo spaces of trucks and trailers.

2. Description of the Prior Art

The evaporator and condenser sections of transport refrigeration systems each require air delivery or air mover means in the form of blowers and/or fans for moving air across the finned tubes which make up the evaporator and condenser sections. It is conventional to drive the blowers and fans directly from the prime mover which drives the refrigerant compressor, which may be a dedicated internal combustion engine, such as a Diesel engine; or indirectly by electric motors which are powered by alternators driven by the prime mover. The fans and motors consume a significant percentage of the power available from the prime mover. It would thus be desirable, and it is the object of the present invention, to reduce the power consumed by the air delivery means of transport refrigeration systems, at least when a reduction in air volume will not deleteriously affect the cargo in the conditioned space, to conserve fuel and make additional cooling capacity available to the system.

BRIEF DESCRIPTION OF THE DRAWINGS

The invention may be better understood and further advantages and uses thereof more readily apparent when considered in view of the following detailed description of exemplary embodiments, taken with the accompanying drawings, in which.

DESCRIPTION OF PREFERRED EMBODIMENTS

Figure 1:
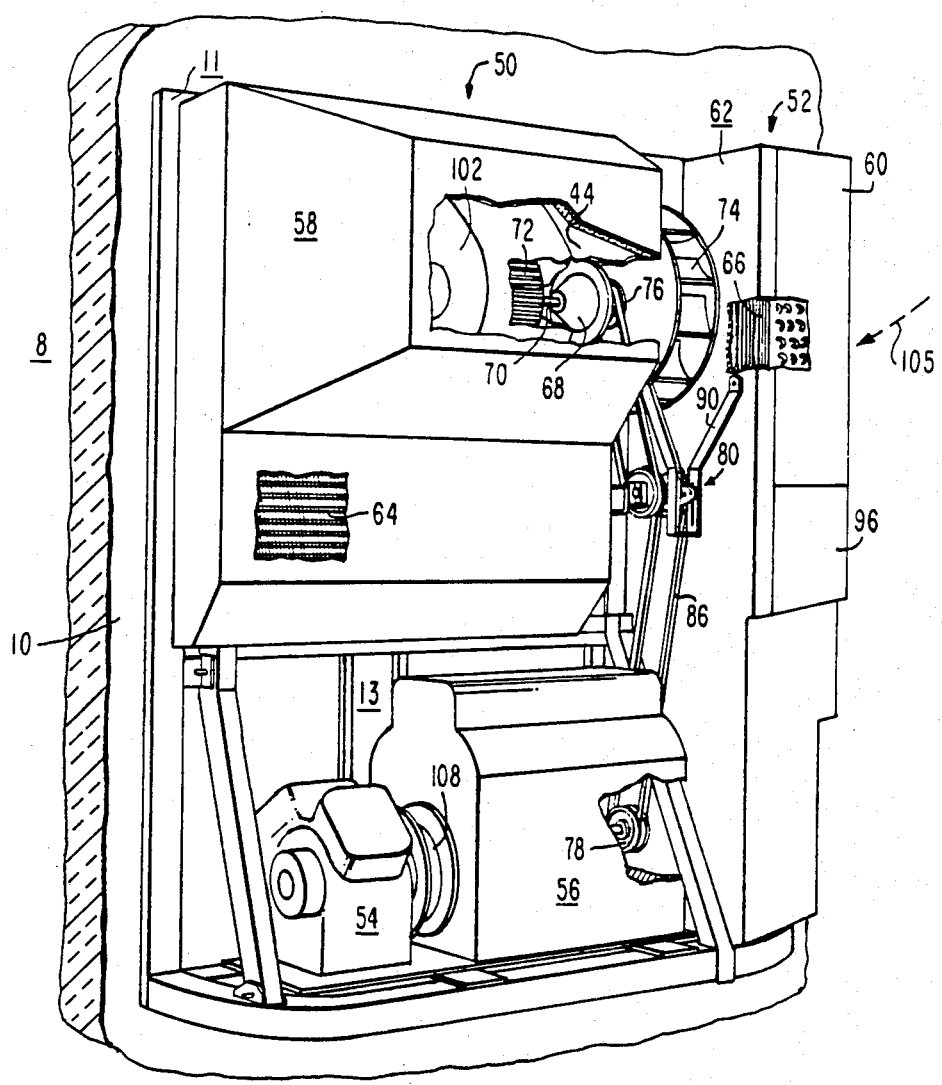
FIG. 1 is a perspective view of a transport refrigeration system which may be constructed according to the teachings of the invention.
Figure 2:
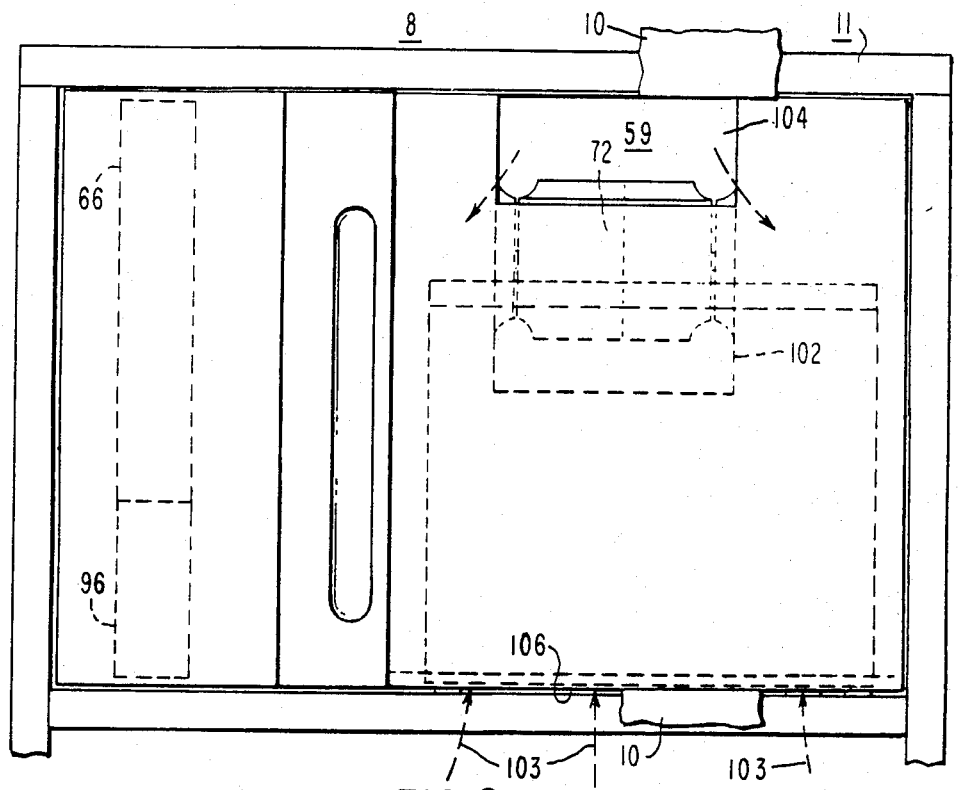
FIG. 2 is an elevational view of the upper portion of the transport refrigeration system shown in FIG. 1, showing the side opposite to that shown in FIG. 1.

U.S. Pat. No. 4,551,986, which is assigned to the same assignee as the present application, discloses a transport refrigeration system of the type which may be constructed according to the teachings of the invention, and this patent is hereby incorporated into the specification of the present application by reference. FIGS. 1 and 2 of the present application are similar to FIGS. 5 and 9, respectively, of the incorporated patent, and these Figures will be described only to the extent necessary to illustrate an exemplary embodiment of the invention. In order to facilitate reference to the incorporated patent, the reference numerals of the incorporated patent will be used where applicable.

More specifically, FIG. 1 is a perspective view, with some parts not shown or broken away, of a transport refrigeration system 8 suitable for mounting on the front wall 10 of a trailer. FIG. 2 is an elevational view of the upper rear portion of transport refrigeration system 8, i.e., the side which is disposed immediately adjacent to wall 10. Transport refrigeration system 8 includes a metallic frame 11 which supports a power pack 13 on the frame base. Power pack 13 includes a refrigerant compressor 54 and a prime mover 56. The prime mover 56 may be an internal combustion engine, with or without auxiliary electric motor drive capability, as desired. The upper portion of frame 11 includes an evaporator section 50 and a condenser section 52, laterally separated by a channel 62. The evaporator section 50 includes evaporator coils 64, and an evaporator plenum 58 which contains an evaporator blower assembly 59.

Evaporator blower assembly 59 includes a double width, double inlet centrifugal evaporator blower 72 mounted on a shaft 70 driven by the prime mover 56 via pulleys 76 and 78, and a belt 86 which is tensioned by a belt tensioner assembly 80.

The blower shaft drive components are disposed in channel 62, with one end of shaft 70 extending into the evaporator plenum 58 via a bearing and support assembly 68 mounted on a relatively thick, thermally insulated wall 44 of plenum 58. A blower housing 102 directs return air from the trailer, indicated by arrows 103 in FIG. 2, which return air enters a duct created by back plate 106 and passes through the finned tubes of evaporator 64, into the axial ends of the double width, double inlet centrifugal blower 72. The air exits from the periphery of blower 72 and is directed into the served or conditioned space of the associated trailer via blower outlet opening 104.

The remaining end of the driven shaft 70 supports a condenser blower 74 disposed in channel 62. Condenser blower 74 draws outside air, indicated by arrow 105, through the condenser section 52 and exhausts the air back to the outside via openings in the casing (not shown) of transportation refrigeration system 8. The condenser section 52 includes a condenser 66 having finned tubes, and an engine radiator 96.

The present invention enables the volume of air delivered by the evaporator blower assembly 59 to be selectively adjusted without requiring the speed of the prime mover 56 to be changed, enabling the speed of the prime mover 56 to be selected for optimum compressor capacity. The invention further enables the volume of air delivered by the evaporator blower assembly 59 to be adjusted without changing the air volume delivered by the condenser blower 74 mounted on the common shaft 70.

The invention recognizes that a frozen load does not require as large a volume of air to be delivered by the evaporator blower assembly 59 as is required by a non-frozen load, and that a lower air flow volume would significantly increase the cooling capacity of the system for frozen load applications. The invention also recognizes that trailers which have the cargo space divided into two or more compartments for the purpose of maintaining different temperatures in the compartments, does not require as large a volume of air flow when only part of the trailer contains cargo. Thus, the broad concept of the invention is to control the volume of air delivered by the evaporator blower assembly 59 based upon need, i.e., the requirements of the served space, with the reduction of air volume translating into fuel savings and additional prime mover capacity for driving the refrigerant compressor 54 and alternator (not shown).

Figure 3:
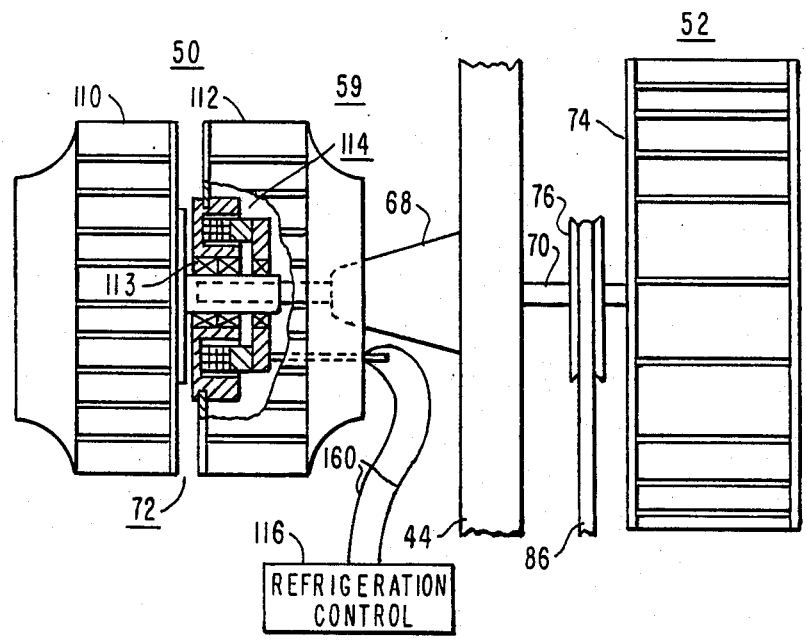
FIG. 3 is a fragmentary view of the transport refrigeration system shown in FIGS. 1 and 2, with the evaporator blower assembly modified according to the teachings of the invention to split the assembly into two blower sections.

A preferred embodiment of the invention is illustrated in FIG. 3, which is a fragmentary view of transport refrigeration system 8, illustrating the evaporator blower assembly 59. According to the teachings of the invention, the double width evaporator blower 72 of assembly 59 is divided or "split" into two independent blower sections, providing first and second blowers 110 and 112, respectively. One of the first and second independent blowers 110 and 112 is fixed to drive shaft 70, and the other is journaled for independent rotation via bearings 113. The blower which is journaled for independent rotation is selectively lockable to the driven shaft 70 by clutch means 114, which in turn is controlled according to "need" by refrigeration control 116. In a preferred embodiment of the invention, the blower which is the farthest from the bearing and support assembly 68, i.e., blower 110, is fixed to driven shaft 70, enabling the bearings 113 and clutch means 114 to be mounted closer to bearing and support assembly 68 to reduce the overhung load.

Figure 4:
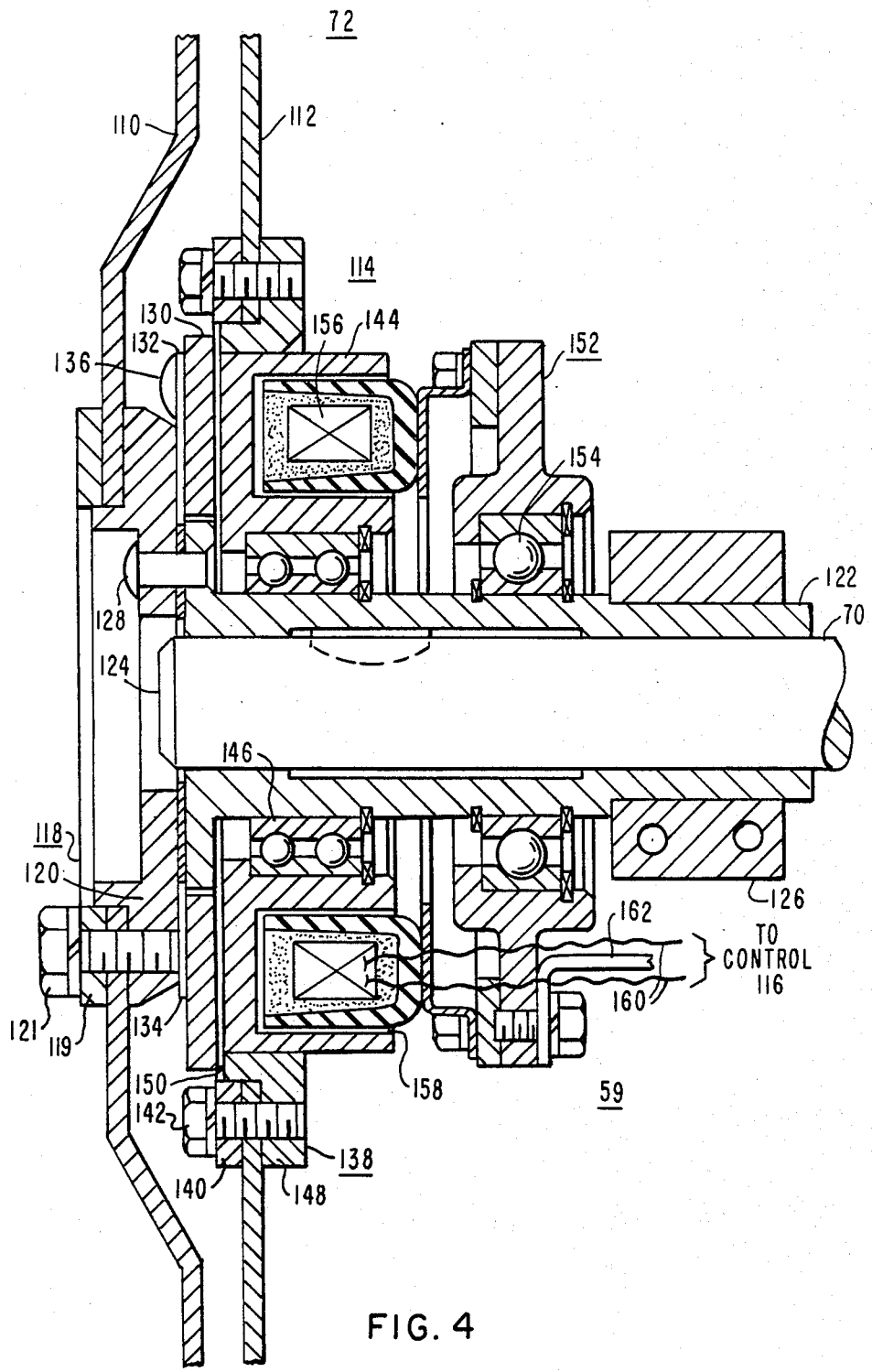
FIG. 4 is an enlarged cross sectional view of the evaporator blower assembly shown in FIG. 3, illustrating an electric clutch which may be used in the evaporator blower assembly shown in FIG. 3, for selectively coupling one of two evaporator blower sections to a driven shaft.

FIG. 4 is an enlarged cross sectional view of evaporator blower assembly 59, including clutch means 114 shown in FIG. 3, illustrating a preferred split evaporative blower assembly and electric clutch arrangement. A blower mounting hub 118 is fixed to blower 110 via a washer 119 and screws 121. Hub 118 includes a flange 120 which receive screws 121, and an elongated sleeve or tubular member 122 which is mounted on and keyed to shaft 70 adjacent to end 124. Tubular member 122 is locked in position on shaft 70 by a split locking collar 126. Flange 120 may be fixed to tubular member 122 by a plurality of fasteners, such as rivet 128, or it may be integral therewith, as desired.

A washer-like metallic plate 130, which functions as the armature of electric clutch 114, is fixed to flange 120 via a plurality of symmetrically arranged flat springs, such as three springs, with two springs 132 and 134 appearing in the cross sectional view of FIG. 4. The rivets 128 which connect flange 120 to tubular member 122 may anchor one end of each flat spring, and rivets, such as rivet 136, may attach the other ends of the springs to armature plate 130.

Blower 112 is journaled for rotation about shaft 70 via a rotor assembly 138, with blower 112 being attached to rotor assembly 138 via a washer 140 and screws 142. Rotor assembly 138 includes a clutch rotor 144 which is mounted on tubular member 122 via a bearing 146, and a mounting flange 148 which is fixed to the periphery of clutch rotor 144, with mounting flange 148 receiving screws 142. A small air gap 150 is provided between armature plate 130 and clutch rotor 144.

A clutch coil assembly 152 is mounted on tubular member 122 via a bearing 154. Clutch coil assembly 152 includes an electric coil 156 which extends into an annular cavity 158 in clutch rotor 144, with a small clearance between coil 156 and rotor 144. Coil 156 includes electrical leads 160, which may be brought out of the blower assembly 59 along an anti-rotation strap 162 fixed to clutch coil assembly 152.

When coil 156 is energized by control 116 it creates a magnetic field in clutch rotor 144, forming an electromagnet which attracts armature plate 130, locking blower 112 to driven shaft 70. When the air volume delivered by both blowers 110 and 112 is not required by the transport refrigeration system 8, such as when a frozen load is in the trailer cargo space, or in a compartmentalized trailer, coil 156 is deenergized by control 116. The springs which attach armature plate 130 to mounting hub 118, indicated at 132 and 134, now snap back to their unstressed configurations, to reestablish air gap 150 and unlock blower 112 from driven shaft 70.

Actual test data shows that when blower 112 is unlocked from the driven shaft the air volume is reduced by 30% and the horsepower required to drive the evaporator blower assembly 59 is reduced by 30%. The disconnected blower 112 freewheels from bearing drag, and develops a sufficient static pressure to prevent any significant recirculation of air within the blower assembly. The savings in horsepower translate directly into increased cooling capacity and fuel savings.

We claim as our invention:

1. A transport refrigeration system including a compressor, compressor prime mover, condenser and evaporator, the improvement comprising:
   an evaporator blower assembly including a shaft driven by the prime mover, first and second blowers, and clutch means,
   said first blower being fixed to said driven shaft,
   said second blower being journaled for rotation about said driven shaft,
   said clutch means being disposed to selectively couple and decouple said second blower to said first blower,
   and condenser air mover means driven by the prime mover,
   whereby said first and second blowers may be coupled for rotation with said driven shaft when the transport refrigeration system requires the air volume of both said first and second blowers, and decoupled such that only said first blower rotates with said driven shaft, when the transport refrigeration system requires only the air volume of said first blower, to change the volume of air delivered by said evaporator blower assembly without the necessity of changing prime mover speed, and without changing the volume of air delivered by said condenser air mover means, to increase cooling capacity and save energy when the air volume of said first blower is adequate.

2. The transport refrigeration system of claim 1 wherein the first and second blowers are centrifugal blowers and they cooperatively define a double width, double inlet blower assembly.

3. The transport refrigeration system of claim 1 wherein the clutch means is an electrically operated clutch.

4. The transport refrigeration system of claim 1 wherein the first blower is fixed to an end of the driven shaft via a mounting hub, and the second blower is journaled for rotation via bearings disposed on said mounting hub.

5. A transport refrigeration system including a compressor, compressor prime mover, condenser and evaporator, the improvement comprising:
   an evaporator blower assembly including a shaft driven by the prime mover, first and second blowers, and clutch means,
   said first blower being fixed to an end of the driven shaft via a mounting hub,
   said clutch means being journaled for rotation via bearings disposed on said mounting hub, said second blower being fixed to the clutch means,
said clutch means being operable to selectively couple and decouple said second blower to said first blower,
whereby said first and second blowers may be coupled for rotation with said driven shaft when the transport refrigeration system requires the air volume of both said first and second blowers, and decoupled such that only said first blower rotates with said driven shaft, to increase cooling capacity and save energy when the air volume of said first blower is adequate.

6. The transport refrigeration system of claim 1 wherein the first blower is fixed to an end of the driven shaft, and the condenser air mover means is fixed to the remaining end of the driven shaft.

* * * * *